United States Patent
Koenigsberger et al.

(10) Patent No.: US 10,144,159 B2
(45) Date of Patent: *Dec. 4, 2018

(54) METHOD FOR PRODUCING AN INSULATING WEB

(71) Applicant: Ensinger GmbH, Nufringen (DE)

(72) Inventors: Bernhard Koenigsberger, Treffelstein (DE); Wolfgang Paulus, Lam (DE); Hartmut Leimbrink, Ammerbuch (DE); Mario Schneider, Schorndorf (DE); Lena Stiehl, Stuttgart (DE); Guido Lange, Stuttgart (DE); Josef Bertele, Weissenhorn (DE)

(73) Assignee: ENSINGER GMBH, Nufringen (DE)

( * ) Notice: Subject to any disclaimer, the term of this patent is extended or adjusted under 35 U.S.C. 154(b) by 241 days.

This patent is subject to a terminal disclaimer.

(21) Appl. No.: 15/263,561

(22) Filed: Sep. 13, 2016

(65) Prior Publication Data

US 2016/0375614 A1    Dec. 29, 2016

Related U.S. Application Data

(63) Continuation of application No. PCT/EP2015/055693, filed on Mar. 18, 2015.

(30) Foreign Application Priority Data

Mar. 19, 2014    (DE) .................. 10 2014 103 727

(51) Int. Cl.
*B29C 43/22*     (2006.01)
*B29C 70/50*     (2006.01)
(Continued)

(52) U.S. Cl.
CPC ............ *B29C 43/222* (2013.01); *B29C 43/52* (2013.01); *B29C 51/42* (2013.01); *B29C 70/504* (2013.01);
(Continued)

(58) Field of Classification Search
None
See application file for complete search history.

(56) References Cited

U.S. PATENT DOCUMENTS

| | | |
|---|---|---|
| 2,896,692 A | 7/1959 | Villoresi |
| 4,079,114 A | 3/1978 | Bonner |

(Continued)

FOREIGN PATENT DOCUMENTS

| | | |
|---|---|---|
| CH | 449 247 | 12/1967 |
| DE | 1 604 699 | 3/1971 |

(Continued)

OTHER PUBLICATIONS

International Preliminary Report on Patentability in International Application No. PCT/EP2015/055693, dated Sep. 20, 2016.

(Continued)

*Primary Examiner* — Monica A Huson
(74) *Attorney, Agent, or Firm* — Leydig Voit & Mayer

(57) ABSTRACT

A method for manufacturing an insulating bar made from a thermoplastic plastics material whereof the base body has a corrugated structure comprises shaping the insulating bar as a blank having a substantially planar structure of the base body without raised portions and recesses but with the connection strips, cooling the blank to a temperature corresponding to the maximum long-term service temperature of the plastics material or lower, heating the base body to a forming temperature which, for crystalline plastics materials, is approximately 30° C. below the crystallite melting point of the plastics material or higher, and for amorphous plastics materials, is approximately 30° C. above the softening point or higher, forming the base body by a tool to produce the alternating raised portions and recesses, while retaining the geometry of the connection strips, and cooling (Continued)

the insulating bar to a temperature corresponding to the maximum long-term service temperature or lower.

30 Claims, 11 Drawing Sheets

(51) Int. Cl.
*B29D 99/00* (2010.01)
*B29C 43/52* (2006.01)
*B29C 51/42* (2006.01)
B29L 31/00 (2006.01)
E06B 3/277 (2006.01)
E06B 3/263 (2006.01)
B29K 101/12 (2006.01)
B29K 105/06 (2006.01)

(52) U.S. Cl.
CPC .... *B29D 99/0007* (2013.01); *B29C 2791/001* (2013.01); *B29K 2101/12* (2013.01); *B29K 2105/06* (2013.01); *B29L 2031/003* (2013.01); *B29L 2031/006* (2013.01); *E06B 3/277* (2013.01); *E06B 2003/26358* (2013.01)

(56) References Cited

U.S. PATENT DOCUMENTS

| | | | |
|---|---|---|---|
| 4,395,862 A | 8/1983 | Jäger et al. | |
| 4,674,972 A | 6/1987 | Wagner | |
| 7,871,261 B2 | 1/2011 | Steiner et al. | |
| 2005/0008825 A1 | 1/2005 | Casey et al. | |
| 2017/0001358 A1* | 1/2017 | Krohmer | B29C 47/0061 |

FOREIGN PATENT DOCUMENTS

| | | |
|---|---|---|
| DE | 28 50 428 | 5/1980 |
| DE | 29 37 454 A1 | 4/1981 |
| DE | 32 36 357 A1 | 4/1984 |
| DE | 198 04 222 C2 | 4/2003 |
| DE | 20 2008 012 945 U1 | 12/2008 |
| DE | 10 2011 113 456 A1 | 9/2012 |
| EP | 2 497 888 A2 | 9/2012 |
| GB | 1132969 | 11/1968 |
| WO | WO 2007/128787 A1 | 11/2007 |

OTHER PUBLICATIONS

International Bureau, International Search Report in International Patent Application No. PCT/EP2015/055693, dated May 29, 2015.
International Bureau, Written Opinion in International Patent Application No. PCT/EP2015/055693, dated Jun. 1, 2015.
German Patent Office, Search Report in German Patent Application No. 10 2014 103 727.8, dated Feb. 12, 2015.

* cited by examiner

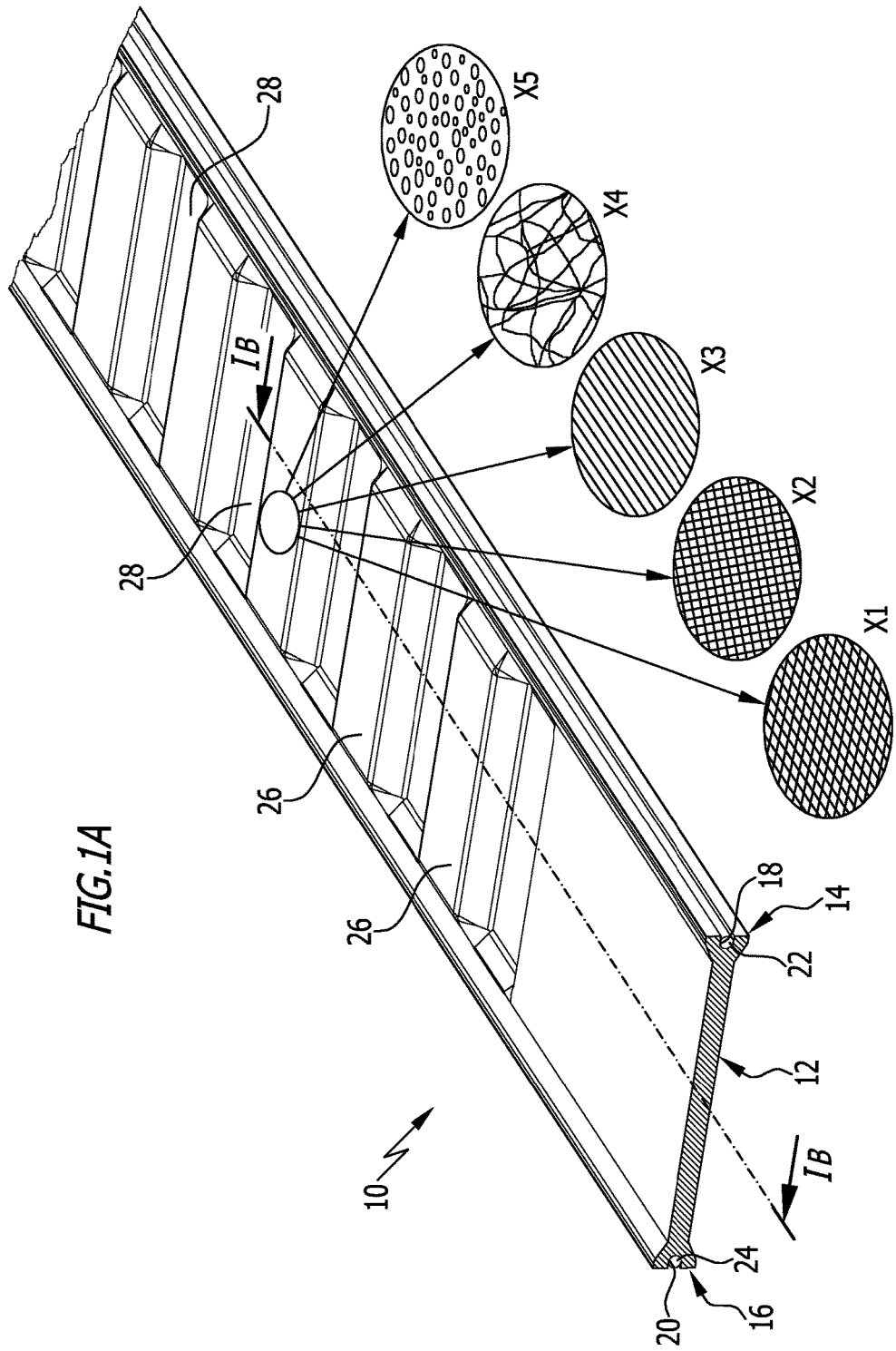

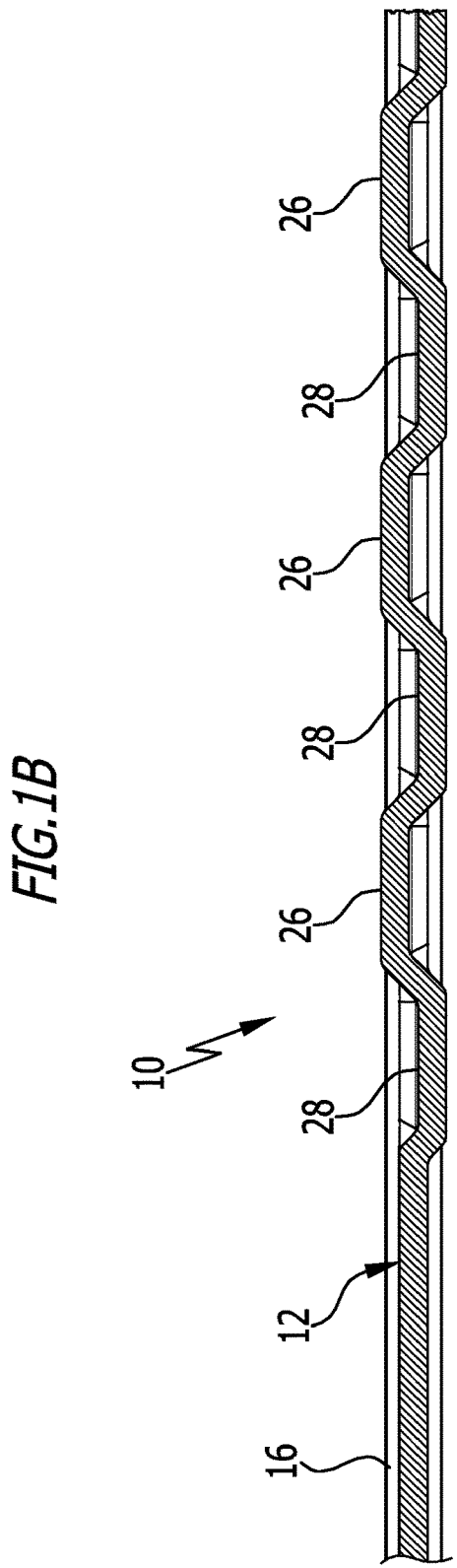

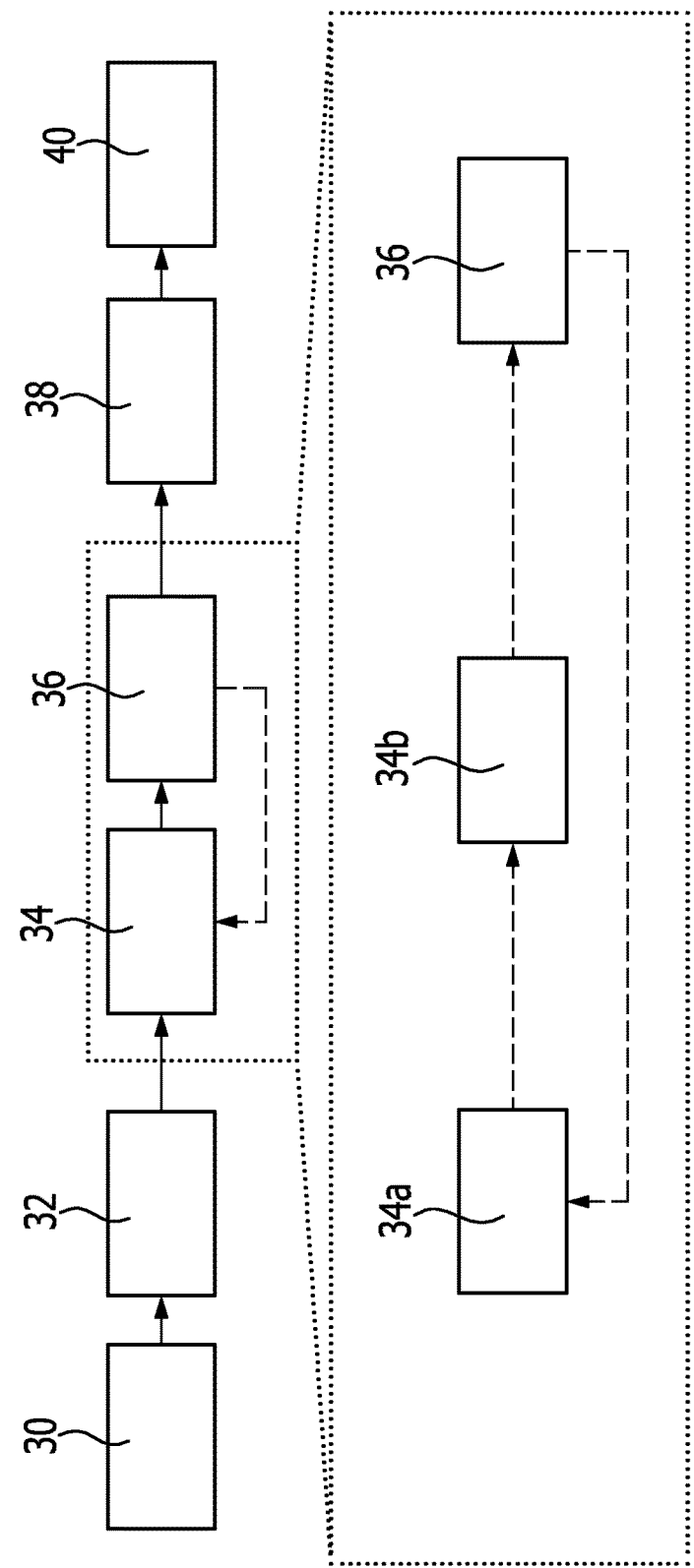

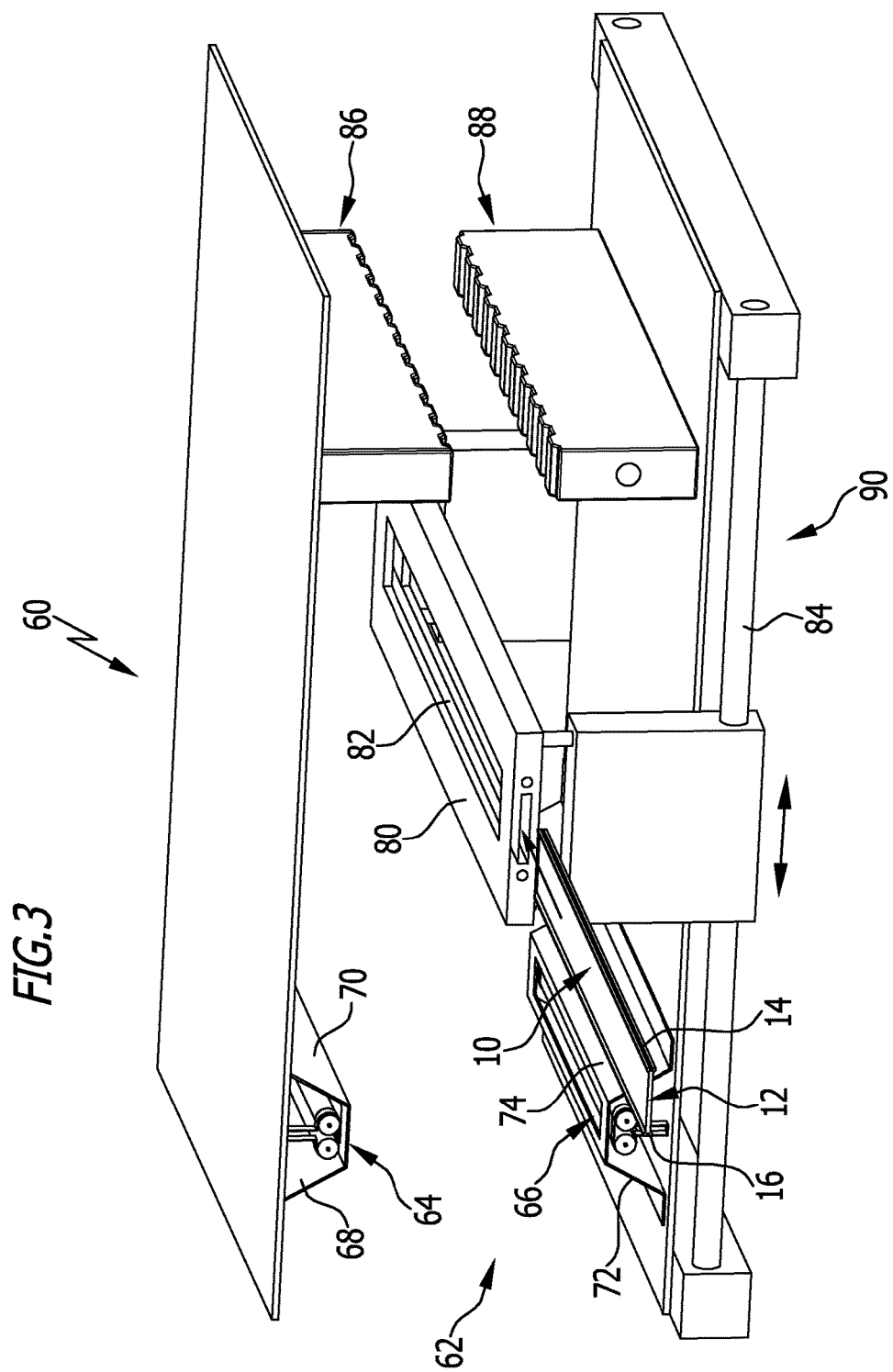

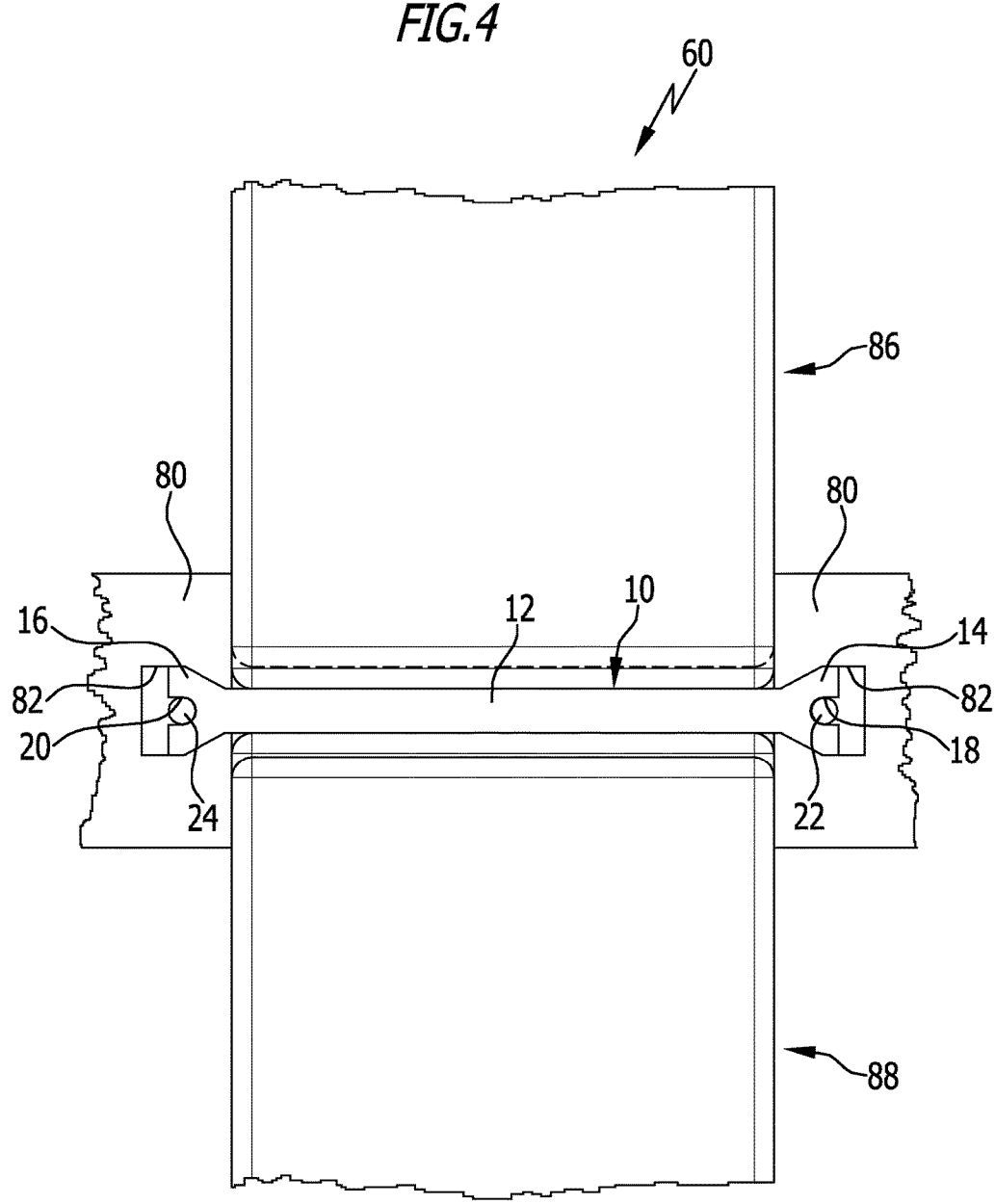

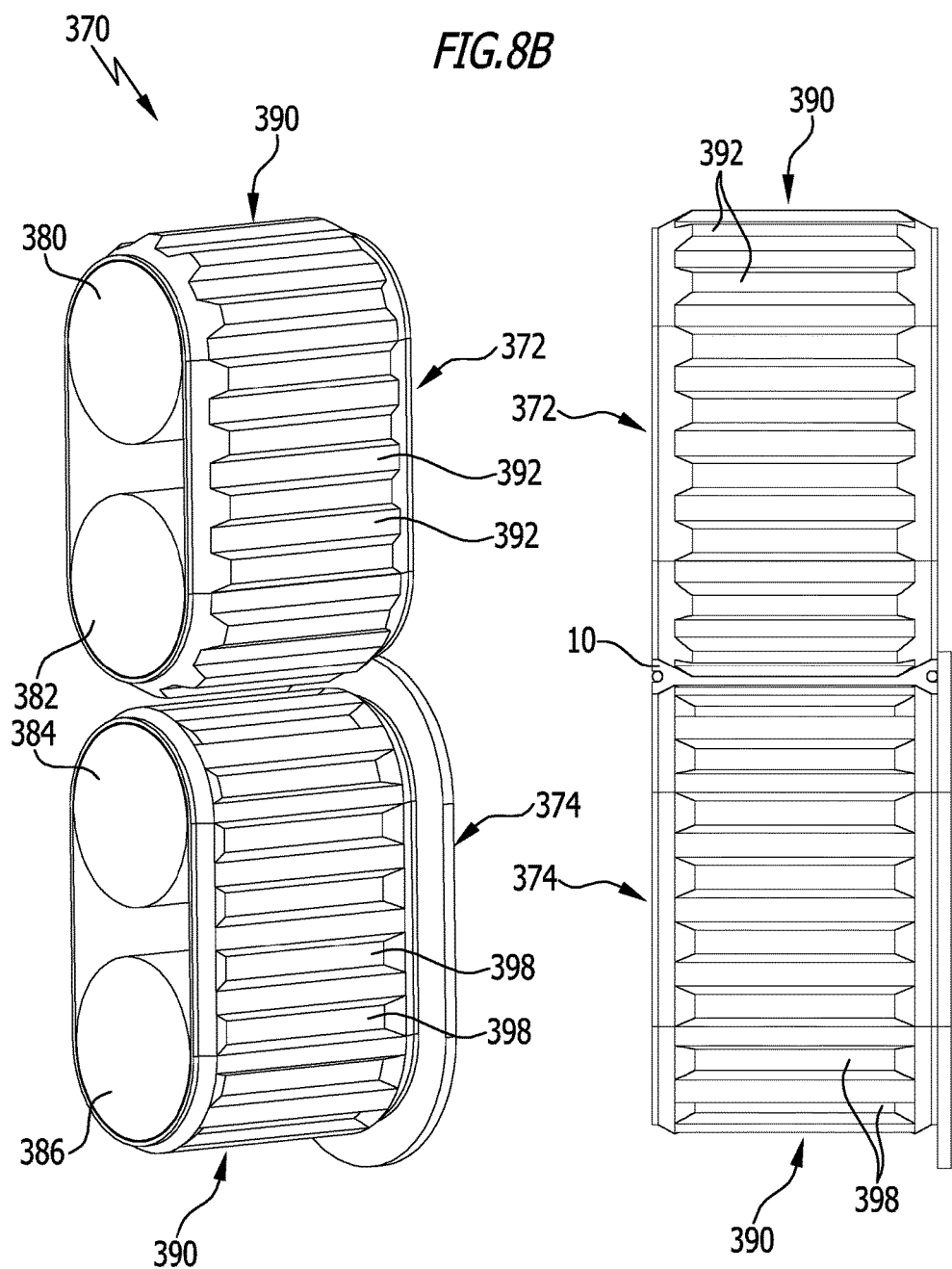

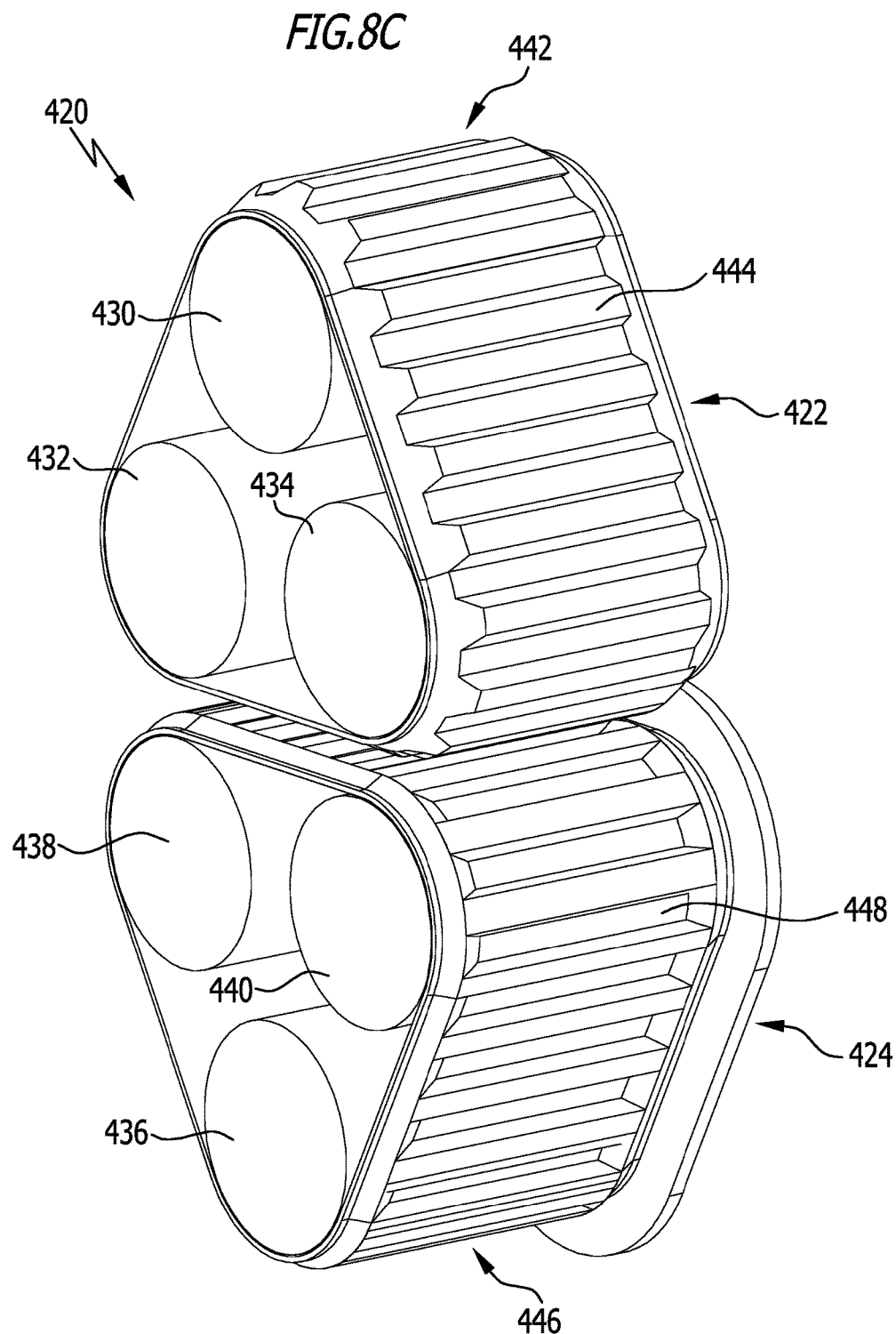

METHOD FOR PRODUCING AN INSULATING WEB

CROSS REFERENCE TO RELATED APPLICATIONS

This patent application is a Continuation of International Patent Application No. PCT/EP2015/055693, filed Mar. 18, 2015, which claims the benefit of German Patent Application No. 10 2014 103 727.8, filed Mar. 19, 2014, which are each incorporated by reference.

BACKGROUND OF THE INVENTION

The invention relates to a method for manufacturing an insulating bar for composite profiles, wherein the insulating bar is made from a thermoplastic plastics material and has a strip-like base body and, integrally formed on the opposite longitudinal edges thereof, connection strips.

Insulating bars of this kind are used during the manufacture of composite profiles for a shear-resistant mechanical connection and thermal insulation of metal profiles that are to be arranged on the outside and the inside, as are used in particular for manufacturing window frames, doorframes, façade elements and similar.

Insulating bars of this kind are known in many forms, for example from DE 32 36 357 A1, and depending on the spacing required between the metal profiles of the composite profile are made to an appropriate width.

Conventionally, the insulating bars have a substantially planar base body. More recently, it has been proposed to use insulating bars having a structured base body in order to improve the heat insulation without reducing the static strength of the composite profile (cf. for example EP 2 497 888 A2).

For improving the heat insulating properties of the composite profiles that are formed in this way, it has been proposed, in EP 2 497 888 A2, inter alia that the base body should be provided with a corrugated structure extending transversely as seen in the longitudinal direction of the insulating bar. The improvement in heat insulation that is achievable thereby results on the one hand from the fact that the corrugated structure increases the length of the path that the insulating bar provides for heat conduction from one metal profile to the other. On the other hand, the corrugated structure improves the rigidity of the insulating bar such that, with the same mechanical properties, smaller wall thicknesses are possible in the base body of the insulating bar, such that the cross section available in the insulating bar for heat conduction can additionally be reduced.

Moreover, losses due to both heat radiation and heat convection are expected to be lower as a result of using insulating bars of this kind.

In principle, this kind of insulating bar can be formed by machining out of an insulating bar that is manufactured with a substantially planar base body, or indeed can also in principle be manufactured with the final structure by injection moulding.

However, machining is not only time-consuming but also demands a greater use of materials. The method of injection moulding, on the other hand, finds its limits very quickly, since the insulating bars are conventionally manufactured by the metre, for example to a length of 6 m. The injection moulds needed for this are not only extremely expensive but are also problematic, at the required insulating bar lengths, as regards sufficiently uniform filling of the moulds.

Further, a combined method based on injection moulding and extrusion is known (WO 2007/128787 A1) by means of which profiled elongate component parts can be made. With the method described there, it proves disadvantageous that the moulds that are needed for application to products described in this application require a very great longitudinal extent and are thus complex and disproportionately expensive. Admittedly, the structures described could be produced in theory, but only with additional work steps that demand forming subsequent to the procedure of filling the mould during cooling of the product, or machining.

BRIEF SUMMARY OF THE INVENTION

In insulating bars, it is important to keep within a small tolerance in the dimensions of the connection strips, since during processing to give composite profiles the connection strips have to be pushed into receptacles of complementary shape on the metal profiles. In order to ensure that the insulating bars are connected to the metal profiles as well as possible and in particular in shear-resistant manner, the dimensions of the cross section of the receptacles differ only slightly from those of the connection strips. For this reason, a manufacturing method for the structured insulating bars must in particular also provide the assurance that it is possible to keep within the tolerance stipulations for the connection strips.

It is the object of the invention to propose a method by means of which the known insulating bars having a corrugated structure of the base body may be manufactured economically.

This object is achieved according to the invention by a method as defined in claim 1.

The insulating bar is initially manufactured, for example in an extrusion method, as a blank having a substantially planar, strip-like base body and the connection strips, which are preferably already shaped to have the final geometry. The connection strips project from the longitudinal edges of the base body in a direction that is typically parallel to the plane of the base body, where appropriate having an offset.

The insulating bar blank is first cooled to a temperature corresponding to the maximum long-term service temperature or less, wherein the term "maximum long-term service temperature" is understood to mean a temperature according to DIN 53476.

This permits simple handling of the blanks and makes it easier to control the process sequence of the present invention, since the subsequent steps after the blank has been constructed may where necessary be performed at a separate time. Moreover, with this temperature stipulation it is ensured that the geometry of the connection strips can be retained with the original degree of precision. In particular, cooling of the insulating bar blanks to approximately 50° C. or less takes place. In this case, it is also possible for insertion of the blanks into the device for heating and forming the insulating bar blanks to be performed by hand.

As a result of the targeted heating of the base body of the insulating bar blank, the following forming thereof by means of a tool and the subsequent cooling, it is possible to obtain an insulating bar of the type mentioned in the introduction in which the connection strips that are present on the longitudinal edges still have sufficient accuracy in their geometry for keeping within the tolerance stipulations even without an after-treatment, and for the insulating bars to be able to be processed simply with the metal profiles to give a composite profile.

Forming of the base body is carried out at a temperature that, in the case of (partially) crystalline plastics materials, is geared to the crystallite melting point. The term "crystallite melting point" is understood, in the context of the present invention, to mean the temperature at which the curve in a DSC measurement according to DIN EN ISO 11357-3 reaches the (first) endothermic peak.

The base body is heated to a temperature in the region of approximately 30° C. below the crystallite melting point or to a higher temperature before it undergoes forming.

Preferably, the forming temperature is limited to a value of up to approximately 50° C. above the crystallite melting point.

When amorphous plastics materials are used, the base body is heated to a forming temperature that is approximately 30° C. above the softening point (DIN EN ISO 306 VST A120) or higher.

Preferably, in this case the forming temperature is limited to a value of up to approximately 60° C. above the softening point.

At the same time, these measures for the forming temperature allow the geometry of the connection strips that is already present in the blank to be retained as described above without excessive complexity.

Although the forming of plastics material bars to give structured bars that are similar to corrugated metal strips is known from DE 28 50 428, in that case the profile is formed over its entire width, so the requirement made in the present case, to retain the geometry of the connection strips, was not required there and did not need to be taken into account. According to that prior art, a C-shaped cross section of the plastics material bars is only achieved thereafter, by bending the edges.

Surprisingly, by means of the method according to the invention, there is success on the one hand in providing a sufficiently pronounced structure in the base body of the insulating bars with a complexity that is economically acceptable, but at the same time in ensuring the dimensional accuracy of the geometry of the connection strips, with the result that processing of the insulating bars to give composite profiles is successful without further measures, in particular also without an after-treatment of the connection strips.

The insulating bar blanks that are formable by the method according to the invention may also have a tray-shaped base body which, after the forming process, may be filled with a material having a high degree of porosity and may be provided with further functional elements such as are known for example from DE 198 04 222 C2. Where appropriate, the tray shape of the base body may be produced together with the shaping of the raised portions and recesses.

Furthermore, according to the invention it is also possible to produce insulating bars in which so-called sealing wires made from plastics material in the connection strips are already incorporated in the insulating bar blank and melt at a temperature in the region of approximately 95° C. to approximately 100° C. By means of these sealing wires, the shear-resistant nature of the finished composite profile can additionally be ensured.

According to a preferred embodiment of the method according to the invention, during the forming process alternating raised portions and recesses are produced at regular intervals, as seen in the longitudinal direction of the base body.

Further preferably, the raised portions and recesses are shaped during the forming process such that they extend substantially over the entire width of the base body. In this way, optimum heat insulation can be achieved using the insulating bars that are manufactured according to the invention.

Further preferably, the raised portions and recesses are oriented substantially perpendicular to the longitudinal direction of the insulating bar. In this way, a maximum effect of stiffening the insulating bars is achieved in relation to forces acting perpendicular to the plane of the base body. Moreover, a stabilisation against so-called shunting is achieved, with the result that, if forces of different magnitude act on the two connection strips in the longitudinal direction of the insulating bar, deformation of the insulating bar is countered.

Preferably, the shaping of the raised portions and recesses provides a structure in which surface regions that are attributable to the raised portions and recesses deviate from the centre plane of the base body of the insulating bar by approximately 0.5 times to approximately twice the thickness of the base body. Within these limits, on the one hand a marked effect is achieved as regards the improvement in heat insulation, the improvement in the mechanical strength and hence the possibility of saving on materials, and on the other hand the plastics material is not put under excessive load during the forming, so the long-term load-bearing capacity of the insulating bars remains ensured. Further preferably, the deviation is approximately 0.7 times to approximately 1.3 times.

As the thermoplastic plastics material for the insulating bars, there is preferably used a material that is selected from polyamides (PA), in particular PA 12 and PA 6,6, polypropylene (PP), acrylonitrile butadiene styrene copolymers (ABS), polyphenylene ether (PPE), syndiotactic polystyrene (sPS), polyvinyl chloride (PVC), polyesters, in particular polyethylene terephthalate (PET) and polybutylene terephthalate (PBT), polyketones, thermoplastic polyurethanes (TPU) and blends of the above-mentioned polymers.

For these preferred plastics materials, crystallite melting points or softening points and the maximum long-term service temperatures are approximately as follows:

| Plastics material | Crystallite melting point [° C.] | Softening point [° C.] | Max. long-term service temperature [° C.] |
| --- | --- | --- | --- |
| Polyamide 6,6 | approx. 250 | — | approx. 100 |
| Polyamide 6,6 GF 25 | approx. 250 | — | approx. 100 |
| Polyamide 12 | approx. 180 | — | approx. 100 |
| Polypropylene | approx. 160 | — | approx. 100 |
| ABS | — | approx. 100 | approx. 75 |
| Polyphenylene ether | — | approx. 120 | approx. 85 |
| Polyester (PET) | approx. 250 | — | approx. 100 |
| Polyester (PBT) | approx. 220 | — | approx. 100 |
| Polyketone | approx. 220 | — | approx. 100 |

The plastics material may be present in the insulating bar as a compact, substantially pore-free material. In this case, the porosity or pore volume is below approximately 3 vol %.

In many cases, it is possible to achieve an improvement in the heat insulation properties of the insulating bars without the mechanical capability of the insulating bars being insufficient if the plastics material is present as a porous material in at least a partial region of the insulating bar, in particular in the base body. Preferably, in this case the pore volume is approximately 5 to approximately 30 vol %, further preferably approximately 5 to approximately 25 vol %, and most preferably approximately 5 to approximately 20 vol %.

Preferably, the porous plastics material of the insulating bar has an average pore size of approximately 5 μm to approximately 150 μm, further preferably approximately 20 μm to approximately 140 μm.

The porosity of the plastics material of the insulating bar may be achieved by the use of a porous starting material, or indeed be produced only on heating the insulating bar blank to the forming temperature.

Further preferably, the thermoplastic plastics material may contain one or more additives, in particular selected from glass fibres, mineral fibres, plastics fibres, in particular aramid fibres, carbon fibres, hollow glass spheres, fire retardants, in particular magnesium hydroxide, aluminium hydroxide, melamine derivatives, red phosphorus, inorganic and organic phosphates, and expansion and blowing agents.

Fibrous fillers have a particular significance as additives. These may be embedded in different forms in the plastics materials and the insulating bars that are shaped therefrom. Particularly preferred are short, long and continuous fibres, which can be arranged on the one hand in an even distribution in the insulating bars, or at least in the base body, or on the other hand as a two-dimensional flat fibre structure, in particular in the form of felts, fibre mats, nonwovens and woven fabrics. Moreover, the fibrous fillers may also be integrated in the insulating profiles in the form of rovings and fibre strands.

Particularly preferably, the fibrous fillers are embedded in the plastics material with a preferential direction, for example parallel and/or perpendicular to the longitudinal direction of the insulating bar.

Fibrous fillers can be used not only in compact, non-porous plastics materials, but also in the above-described porous materials, in which case relatively large pore volumes can be realised even in the case of insulating bars that are intended to take up relatively large forces.

Further preferably, in the method according to the invention an insulating bar is formed whereof the thermoplastic plastics material also includes a commercially available so-called impact modifier.

Preferably, in the method according to the invention, during heating of the base body, the connection strips are separately protected from the introduction of heat, during which the connection strips are further preferably kept at a temperature that corresponds to the heat deflection temperature under load (measured according to DIN EN ISO 75 under a load of 1.8 MPa) of the plastics material or lower. Preferably, the temperature reached by the connection strips during the heating for the forming process is limited to the maximum long-term service temperature indicated for the plastics material.

Heating of the base body may be done by means of radiation, convection, ultrasound or indeed contact heating, wherein a temperature in the range of approximately 30° C. below the crystallite melting point to approximately 50° C. above the crystallite melting point should be reached. Preferably, during heating of the base body before forming, a temperature in the range of approximately ±25° C. either side of the crystallite melting point is reached.

For example, with a polyamide 6,6 having a glass fibre content of 25 weight % and a crystallite melting point of approximately 250° C., a preferred forming temperature of the base body is approximately 220° C. or higher.

With ABS materials having a softening point of approximately 100° C., there is selected as the forming temperature a temperature of approximately 130° C. or higher, and in particular the temperature is selected to be in the range of 130° C. to approximately 160° C.

For heating of the insulating bar blank, in particular radiation, convection, ultrasound or contact heating are available as suitable techniques.

If the heating is performed by means of radiation, in particular IR radiation, it may already be sufficient to shield the radiant heater such that no radiation acts directly on the connection strips, in order to retain their geometry with sufficient accuracy.

The spacing between the radiant heaters and the insulating bar should be sufficiently large, or other precautions should be taken, for no heat to be able to accumulate in the heating device. It is advantageous in the case of heating by means of radiation for not only the surface to be heated but also, because of the depth of penetration of the radiation, the interior of the base body itself. In this way, the time required for uniform heating of the base body over its entire cross section is minimised.

Another way of protecting the connection strips from an input of energy consists in receiving them in a guide which, although it leaves the base body substantially free, by contrast overlaps the connection strips as fully as possible. Where applicable, the guides may be cooled such that an even better delimitation of the input of energy in relation to the base body may be achieved.

In the case of heating by means of convectors, the base body is heated up comparatively slowly and very gently. In this variant, the longer time needed is less advantageous.

According to the invention, an input of energy by means of contact heating is also possible, in which case a larger temperature gradient is initially established, as seen over the cross section of the base body. The time needed for contact heating is between that needed for radiation heating and that for heating by means of convection.

Further preferably, the introduction of energy during heating of the base body is performed on two opposite sides of the base body such that a more rapid and moreover uniform heating of the base body is obtained before the forming procedure.

Moreover, heating of the base structure may be performed in two or more stages, as a result of which it becomes possible to keep within the temperature stipulations particularly well. In particular, it is recommended in the case of a two-stage or multiple-stage heating to select the introduction of energy into the plastics material to be higher in the first stage than in the following stage or stages. In particular, a shorter time period can be set for the first stage than for the second stage.

Preferably, the tool that is used for forming the base body undergoes a temperature control, wherein the temperature of the tool is in particular kept at a temperature that is approximately 120° C. or less, further preferably approximately 100° C. or less, most preferably approximately 90° C. or less.

Further preferably, the tool is kept constantly at a temperature in the range of approximately 50° C. to approximately 120° C., preferably in the range of approximately 50° C. to approximately 80° C.

For example, when polyamide 6,6 having a glass fibre content of 25 weight % is processed, a tool temperature of approximately 50° C. to approximately 80° C. is suitable.

The forming process itself may be carried out in particular as a thermoforming method or as compressed air forming.

For the forming process, there is preferably used a stamping tool, in particular in the form of a stamping die, a stamping wheel or a multiple-part, in particular chain-shaped, stamping tool.

Here, the forming process may be carried out intermittently or indeed continuously, wherein even if a stamping die is used a continuous method may be implemented, in particular by moving the stamping die along with the insulating bar as the latter passes through the forming device.

Further preferably, the insulating bar blank first undergoes a drying before it is heated to the forming temperature and formed. As well as forming of the insulating bar blank directly to give the desired structured insulating bar in one step, it is possible to carry out forming of the blank to give the structured insulating bar in a plurality of steps one after the other.

As an alternative, in the method according to the invention the insulating bar blanks coming from the manufacturing process (such as extrusion) may undergo forming in a second step directly using a residual heat content, as a result of which a more favourable energy balance for the manufacturing method according to the invention is achieved.

Further preferably, in the method according to the invention a plurality of insulating bars are formed alongside one another in a forming device such that a considerably larger throughput in manufacture of the controlled insulating bars is achievable in a manner saving on space.

These and further advantages of the present invention are described in further detail below with reference to the drawings and the exemplary embodiments.

BRIEF DESCRIPTION OF THE SEVERAL VIEWS OF THE DRAWINGS

Individually, in the drawings:

FIG. 1A shows a perspective illustration of an insulating bar manufactured according to the invention;

FIG. 1B shows a sectional view along line IB-IB through the insulating bar in FIG. 1A;

FIG. 2 shows a schematic illustration of the steps of a preferred embodiment of the method according to the invention;

FIG. 3 shows a first stamping device for carrying out the method according to the invention, in a schematic illustration;

FIG. 4 shows a partial view of the stamping device in FIG. 3;

FIG. 8B shows an alternative stamping tool for use in the stamping device in FIG. 7; and FIG. 8C shows a further variant of the stamping tool in FIG. 8B.

DETAILED DESCRIPTION OF THE INVENTION

Figure 5:
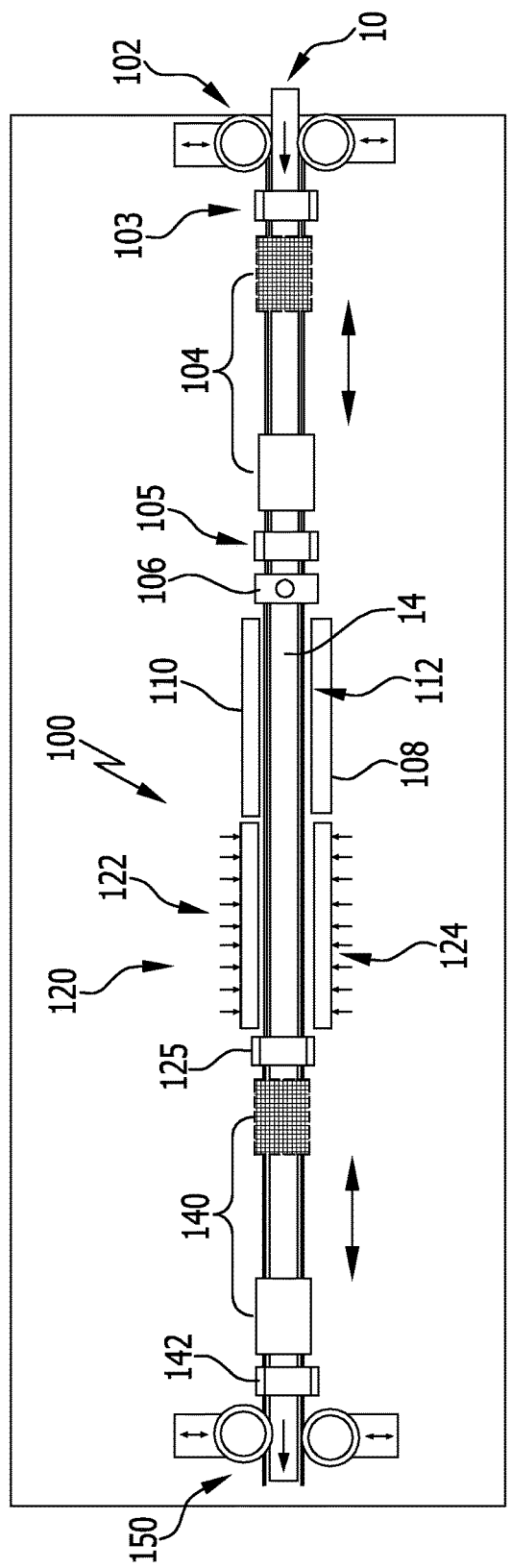
FIG. 5 shows a second stamping device for carrying out the method according to the invention.

FIGS. 1A and 1B show an insulating bar 10 having a strip-like base body 12 and connection strips 14, 16 that are integrally formed on the opposite longitudinal edges thereof, by means of which the insulating bar is introducible into corresponding receptacles in metal profiles and can be held by frictional, force or positive locking. As shown, there are optionally made, in the lateral faces of the connection strips, recesses 18, 20 into which so-called sealing wires 22, 24 made from plastics material may be inserted.

The corresponding receptacles on the metal profiles (not shown) are adapted to the cross sections of the connection strips 14, 16, which in the present examples have a trapezoidal shape, such that, in a so-called "rolling" step, only a slight deformation of the receptacles on the metal parts is required in order to create a sufficiently shear-resistant connection between the insulating bar and the respective metal profile. The composite part may additionally be made shear-resistant by activating the sealing wires 22, 24.

Accordingly, it is of considerable significance that the connection strips 14, 16 have a defined geometry with only small tolerances. This is true in particular of processing insulating bars to give relatively large window, door or façade elements in which sections of the insulating bars and the corresponding metal profiles have to be installed with lengths of 1 to 2 m or indeed more.

In the left-hand part of FIGS. 1A and 1B, the insulating bar 10 is illustrated as a blank. In the part adjoining it to the right, the illustrations show the strip-like base body 12 with the structure, formed by the method according to the invention, which will be described in further detail below, having alternating raised portions 26 and recesses 28. Because of the structure of the strip-like base body 12 with raised portions 26 and recesses 28, the wall thickness of the strip-like base body 12 may be made smaller than conventional insulating bars, since the shaping of the raised portions 26 and recesses 28 allows an additional improvement in the mechanical properties of the insulating bar 10 as a whole to be achieved. This results not only in a saving on materials when the insulating bars 10 are manufactured but additionally in an increase in the thermal resistance and hence in an improvement in the heat insulation of the composite profiles that are obtained using the insulating bar 10 manufactured according to the invention.

In FIG. 1A, different textures in the interior of the base body 12 are illustrated schematically in the enlarged illustrations X1 to X5.

In illustrations X1 to X4, different examples of the arrangement of reinforcing fibres in the plastics material of the base body 12 are illustrated. In illustration X5, a porous structure is schematically shown.

Illustration X1 shows a fibre-reinforced plastics material in which the fibres have been oriented parallel and perpendicular to the longitudinal direction of the insulating bar 10. The reinforcing fibres may be embedded in the plastics material for example as a woven fabric.

Illustration X2 shows a fibre-reinforced plastics material in which the fibres are oriented in two mutually perpendicular directions, each at an angle of approximately 45° to the longitudinal direction of the insulating bar 10. Here too, the reinforcing fibres may be incorporated into the plastics material as a woven fabric.

Illustration X3 shows reinforcing fibres in the plastics material that run parallel to the longitudinal direction of the insulating bar 10, where in this case individual fibres, in particular long fibres or indeed fibre strands, may be used.

Illustration X4 shows reinforcing fibres that are embedded in the plastics material of the base body in the form of a tangled nonwoven.

Illustration X5 shows a porous structure in the interior of the base body.

In the case of illustrations X1 to X4, the presence of the reinforcing fibres is not necessarily visible at the surface of the base body. In many cases, the provision of the reinforcing fibres can be limited to the internal region of the insulating bars 10.

The same also applies to the pore structure that is shown in illustration X5, which can be limited to a core region of the base body 12 or insulating bar 10. As an alternative, the pore structure may also extend up to the surface of the insulating bar 10.

With reference to FIG. 2, initially a first variant of the method according to the invention for manufacturing an insulating bar 10 will be described, in which in a first method step 30 there is performed the extrusion of an insulating bar having a substantially planar, strip-like base body 12, on the longitudinal edges whereof the connection strips 14, 16 are already shaped, complete and with their final geometry, wherein this is also called the blank below.

Thereafter, the insulating bar blanks that are obtained in this way are cooled to a temperature corresponding to the maximum long-term service temperature or lower, in particular approximately 50° C. or less, are stored and where appropriate are pre-dried (step 32). In the method according to the invention, the blanks that are stored and where appropriate pre-dried in the optional step 32 are supplied to a heating process in step 34, wherein the plastics material of the base body 12 is heated in targeted manner to a forming temperature, and in a subsequent step 36 the forming of the base body 12 is then carried out in order to obtain the raised portions 26 and recesses 28. The connection strips 14, 16 are shielded during this such that excessive energy is not introduced and they retain their dimensional accuracy unimpaired.

In the case of (partially) crystalline plastics materials, the forming temperature is approximately 30° C. below the crystallite melting point or higher, in particular in a range approximately ±25° C. either side of the crystallite melting point; in the case of amorphous plastics materials, it is approximately 30° C. above the softening point or higher.

During this, the connection strips 14, 16 are preferably kept at a temperature corresponding to the maximum long-term service temperature of the plastics material or lower.

After forming, in step 38 the insulating bars are together cooled to a temperature corresponding to the maximum long-term service temperature or lower, in particular to approximately 50° C. or less.

In an optional step, the profiles may be provided with a marking, bundled and further processed and/or packaged in any way. In step 40, the finished insulating bars 10 are stored until despatch.

According to a variant, the sequence of steps 34, 36, in which forming of the base body 12 of the insulating bar 10 is performed, may contain a two-stage heating of the base body 12 of the insulating bars 10, wherein in a step 34*a* the base body 12 is first heated using a high heating power and in a subsequent step 34*b* it is heated using a lower power, to the determined final temperature for the forming step 36 by means of stamping.

Preferably, in step 36 the stamping tool that is used likewise undergoes a temperature control, but to a temperature that is lower than the heating temperature that the base body 12 reaches in step 34 or in steps 34*a* and 34*b*.

Preferably, in the method according to the invention it is provided for the insulating bar 10 to remain in the stamping tool in step 36 for sufficient time, such that cooling of the insulating bar 10 or its base body 12 takes place in the tool and the insulating bar 10, with its base body 12, is subsequently cooled to a temperature at which further handling, for example the marking, labelling, bundling, packaging, etc., can be performed without any risk of deforming the insulating bar 10.

Depending on how pronounced the raised portions 26 and recesses 28 are, it may also be provided for forming of the base body 12 of the insulating bar 10 to take place in two or more steps. In such cases, the sequence of steps 34, 36 is then repeated two or more times, wherein the variant having a two-stage or multiple-stage heating process 34*a*, 34*b* is also possible here.

During heating of the base body 12 to the predetermined forming temperature, the connection strips 14, 16 of the insulating bar 10 are shielded, as already mentioned, such that they can at most be slightly warmed, and in particular a deformation thereof is avoided. In particular, care is taken that the melting point of the sealing wire materials is not reached, in cases where the connection strips 14, 16 are equipped with such sealing wires 22, 24.

This procedure makes it possible in particular to use, in the connection strips 14, 16, so-called sealing wires 22, 24, whereof the activation temperature or melting point is frequently in the temperature range of approximately 95° C. to 100° C.

A first embodiment of the stamping device 60 is illustrated schematically in FIGS. 3 and 4.

The stamping device 60 has a heating station 62 having infrared radiant heaters 64, 66 which are arranged above and below a plane of the stamping device 60 in which the insulating bar blanks 10 are introduced and held.

On both sides of the infrared radiant heaters 64, 66 there are arranged in each case shields 68, 70 and 72, 74 which limit the introduction of energy to the region of the base body 12 of the blank 10.

The insulating bar blank 10 is first placed in a mount 80, wherein the connection strips 14, 16 are received in guide slots 82. The mount 80 can be displaced along a guide 84, from the heating position, in which the blank 10 is arranged between the radiant heaters 64, 66, into a forming position, in which the blank 10 is arranged between the stamping dies 86, 88 of a stamping tool 90.

The base body 12 is heated to the forming temperature where appropriate in two or more stages. Very good results were obtained when the radiant heaters were operated in a first step at substantially full power for approximately 5 s and then in a second step at somewhat less than half power for approximately 40 s. This heated the blank through to the optimum in the region of the base part.

Once the region of the base body 12 is heated to the forming temperature, as a result of displacement of the mount 80 the blank 10 is shifted laterally into the stamping tool 90, whereof the stamping dies 86, 88 are arranged in a rest position, pre-heated to a predetermined temperature that is below the forming temperature. Then the stamping dies 86, 88 are moved from above and below, for example hydraulically or pneumatically, into a work position in which the base body 12 is grasped and formed by the stamping dies 86, 88. The time for which the base body is held between the stamping dies is relatively speaking not critical and may be for example approximately 20 s at a stamping force of approximately 30 kN in a stamping tool that generates a stamp 22 mm wide and 120 mm long.

The connection strips 14, 16 are protected from excessive introduction of heat by the mount 80 and are preferably also supported mechanically in the guide slots 82.

The blank 10 remains between the pressed-together stamping dies 86 88 until the temperature of the base body 12 has cooled to a temperature that is in particular below the heat deflection temperature under load or preferably at or below the maximum service temperature, with the result that secure handling of the insulating bar 10, which has now been given its finished shape, is possible.

FIG. 4 shows the situation in which the blank 10 is clamped between the stamping dies 86, 88 of the stamping tool 90 in the region of the base body 12 and is formed.

In the case of an insulating bar blank 10 that is made from fibre-reinforced polyamide 6,6 GF 25 material (polyamide 6,6 having a glass fibre content of 25 weight %) with a crystallite melting point of approximately 250° C., the preferred forming temperature is in the range of approximately 240° C. to approximately 250° C. With this material, the heat deflection temperature under load is approximately 230° C. and the recommended maximum long-term service temperature is approximately 110° C. The stamping dies are heated, preferably to approximately 50° C. to approximately 80° C., in a forming process intended to have one stage.

FIG. 5 schematically shows a second stamping device 100 for carrying out the method according to the invention in a preferred variant.

The stamping device 100 includes a profile supply device 102 by means of which insulating bar blanks 10 are automatically supplied individually to the stamping device 100 from a magazine (not shown). As an alternative, supply may also be performed by hand.

First, the blank 10 is received by a mount 103, which guides the blank 10 into the stamping device 100 at the same time as feeding continues. In the view in FIG. 5, the lateral face of the connection strip 14 is shown (without the recess for a sealing wire).

The stamping device 100 has a feed device 104, which in the present exemplary embodiment takes the form of a tong-like feed arrangement. The feeding of the insulating bar blank 10 that is achievable by means of the feed device 104 is preferably adjustable, for example in a range up to 600 mm. The feed path is adjusted taking into account the length of the stamping tool in the feed direction, and this in turn is dependent on the maximum available stamping force, the width of the insulating bar to be formed, the ductility of the plastics material to be formed at a predetermined forming temperature, etc. Where appropriate, mutually adjoining portions of the insulating bar with a certain overlap undergo the forming step, wherein the overlap is approximately 10% of the length of the stamping tool in the feed direction or less.

At the end of the feed path of the feed device 104, a further mount 105 is provided which also serves to guide the blank 10 in the stamping device 100.

By means of the tong-like feed arrangement 104, the individual insulating bar, which may have a length for example of 6000 mm, is brought up against a profile abutment 106 for the purpose of achieving a defined position along the length of the stamping device 100, and once a blank 10 has been introduced into the stamping device 100 this profile abutment 106 intermittently blocks the feed movement of the feed device 104 along the transport path of the blanks 10.

Downstream of the profile abutment 106 is a heating device 108 in which the insulating bar blank 10 is heated in the region of its base body 12 to the predetermined forming temperature, for example by means of IR radiant heaters, over a length of for example 500 mm. The heating device 108 is preferably, as shown in FIG. 5, equipped with a heating element 110 above and a heating element 112 below the transport plane of the blanks 10, for which reason the portion of the blank 10 that is introduced into the heating device 108 can be heated rapidly.

The power of the radiant heaters can be varied with each heating cycle. In a first time period of a heating cycle, they can be operated at a high power, while in a subsequent second time period a smaller power may be supplied, since in this case substantially only a temperature equalisation within the heated blank has to be achieved. This may be realised for example by a pulsed operation of the IR radiant heaters, wherein a higher pulse rate can be selected for achieving the higher energy input and a lower pulse rate can be selected in the second phase.

Once the forming temperature is reached in the heated portion of the blank 10, in a further cycle the blank 10 is shifted by the length of the heated portion, for example 500 mm, in the longitudinal direction of the stamping device 100 such that the portion that is ready for forming is positioned in the region of the stamping tool 120 in the form of two stamping dies 122, 124, which are at first in a rest position respectively above and below the transport plane of the blank. The stamping dies 122, 124 are preferably pre-heated to a temperature below the forming temperature. As soon as the portion of the blank that is to be formed is correctly positioned, the stamping dies 122, 124 are transferred, for example hydraulically, from their rest position to the active or work position.

Because heating of the following portion of the blank 10, which takes place in parallel therewith, takes more time than the actual forming procedure, the formed portion can remain between the stamping dies, with the stamping dies 122, 124 closed, as a result of which controlled cooling of the insulating bar portion that has just undergone forming is made possible subsequent to the forming before the next cycle, in which the formed portion is pushed out of the stamping tool 120 in the longitudinal direction of the stamping device 100. The measure of controlling the temperature of the stamping dies 122, 124 to a temperature below the forming temperature also serves to aid this controlled cooling.

A mount 125 that performs guidance of the insulating bar 10 is in turn arranged at the output of the stamping tool 120.

As soon as a formed portion of the insulating bar 10 is conveyed out of the stamping tool 120, guided by the mount 125, it is grasped by a further feed device 140, which may likewise be constructed as a tong-like feed arrangement, and guided in the longitudinal direction of the stamping device 100. Downstream of the feed device 140 is, once again, a mount 142 which guides the insulating bar 10.

Finally, the insulating bar 10 leaves the stamping device 100 through the outlet 150, which may contain an automated storage arrangement. As an alternative, it is also possible for the insulating bars 10 to be removed from the stamping device 100 at the outlet 150 by hand.

The stamping device may be constructed to have a machine length of for example approximately 2500 to 3000 mm.

Figure 6:
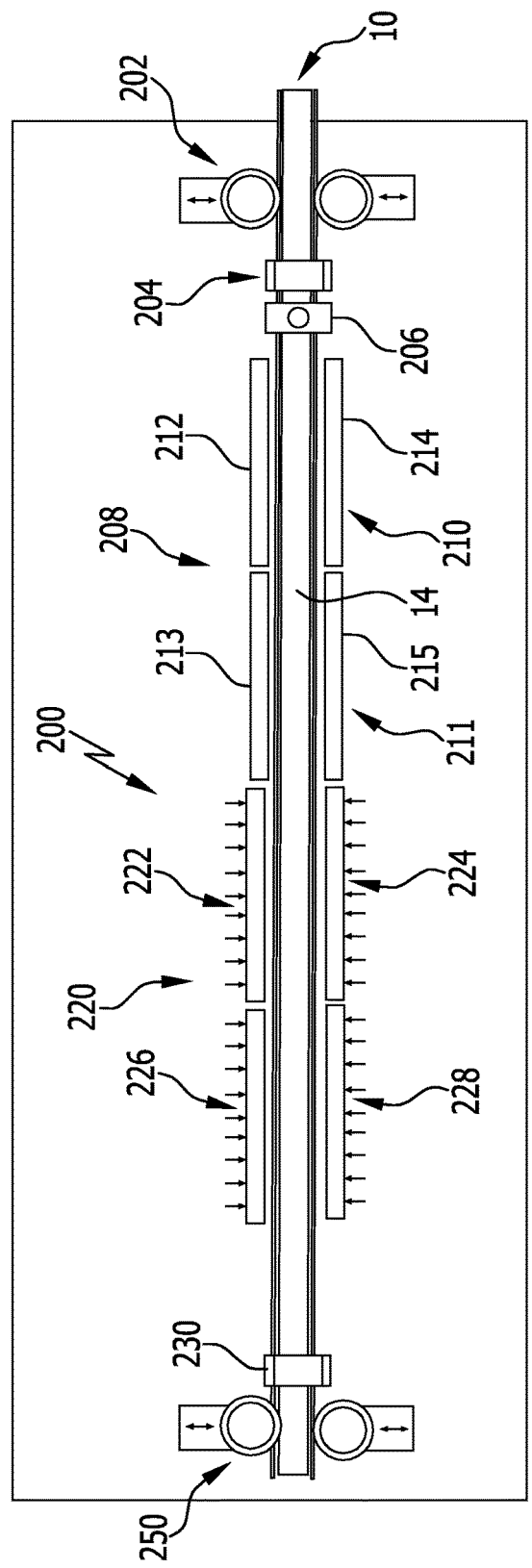
FIG. 6 shows a third stamping device for carrying out the method according to the invention.

FIG. 6 shows an alternative stamping device 200, in which, unlike the stamping device 100, two-stage heating of the blanks 10, and forming of the heated portions of the blanks 10 in two stages, are performed.

The blank 10 is shown in a plan view of the lateral face of the connection strip 14 (without the recess for a sealing wire).

Even though, in this embodiment, both heating of the portions of the blank that are to be formed and the forming itself are each performed in two stages, the layout of a stamping device for carrying out the method according to the invention is independent as regards heating and forming respectively. Two-stage or multiple-stage heating does not necessarily require two-stage or multiple-stage forming, and vice versa.

The stamping device 200 may again be equipped with a profile supply device 202 by means of which insulating bar blanks 10 are automatically supplied individually to the stamping device 200 from a magazine (not shown). As an alternative, supply may also be performed by hand. Downstream of the profile supply device 202, the blank 10 is guided by a mount 204.

In the stamping device 200, the profile supply device 202 also serves, by means of its roller drive, as a feed device. The feeding of the insulating bar blank 10 that is achievable by means of the profile supply device 202 is preferably adjustable, for example in the range of 0 to 1000 mm.

By means of the profile supply device 202, the individual insulating bar blank 10, which as mentioned may have a length of 6000 mm, is first brought up against a profile abutment 206 for the purpose of achieving a defined position along the length of the stamping device 200 after insertion into the stamping device 200, and this profile abutment 206 intermittently blocks the feed movement of the blanks 10.

Downstream of the profile abutment 206 is a heating device 208 in which the insulating bar blank 10 is heated in the region of its base body 12 to the predetermined forming temperature. In the stamping device 200 there are provided two heating stations 210, 211, which are arranged one behind the other, as seen in the longitudinal direction of the device, and, being for example equipped with IR radiant heaters, each bring about a stepwise heating of the base bodies 12 of the blanks 10 over a length of for example 500 mm. The heating device 208 is preferably, as shown in FIG. 6 and as described in connection with the embodiment of FIG. 5, equipped with heating elements 212, 213 above and heating elements 214, 215 below the transport plane of the blanks 10, for which reason the portion of the blank 10 that is introduced into the heating device can be heated rapidly.

According to a variant, the heating is performed mainly in the first heating station 210, while the supply of energy can be less in the second heating station 211. In particular, heating can be such that the forming temperature, for example approximately 240° C., is already achieved in the outer layers of the blank 10 in the first station 210, and all that is still required in the second heating station 211 is a supply of energy great enough to achieve the forming temperature over the entire cross section of the base body 12, that is also in the interior thereof.

Once the forming temperature is achieved in the heated portion of the blank 10 downstream of the second heating stage 211, in a further cycle the blank 10 is shifted by the length of its heated portion, for example 500 mm, in the longitudinal direction of the stamping device 200 such that the portion that is ready for forming is positioned in the region of the stamping tool 220 in the form of two pairs of stamping dies 222, 224 and 226, 228, which are at first in a rest position respectively above and below the transport plane of the blank.

The pairs of stamping dies 222, 224 and 226, 228 are preferably each pre-heated to a temperature below the forming temperature. As soon as the portion of the blank that is to be formed is correctly positioned, the pairs of stamping dies 222, 224 and 226, 228 are transferred, for example hydraulically, from their rest position to the active or work position.

As an alternative, stamping dies that extend over the entire length of the portion of the blank 10 that is to be formed may be used, as was described in connection with the stamping device 100 in FIG. 5.

Because heating of the following portion of the blank, which takes place in parallel therewith, in the heating stations 210, 211 takes more time than the actual forming procedure, the formed portion can remain in the closed stamping tool 220, as a result of which controlled cooling of the insulating bar portion that has just undergone forming is made possible subsequent to the forming before the next cycle, in which the formed portion is pushed out of the stamping tool 220 in the longitudinal direction of the stamping device 200. The measure of controlling the temperature of the stamping tool 220 or the pairs of stamping dies 222, 224 and 226, 228 to a temperature below the forming temperature also serves to aid this controlled cooling.

The length of the stamping tool 220 is selected also to correspond to the length of the heating station 208 of for example 1000 mm.

Downstream of the stamping tool 220, the insulating bar 10 which has now been given its finished form is guided by a mount 230 and is finally supplied through the outlet 250 of an automated storage arrangement. As an alternative, it is also possible for the insulating bars 10 to be removed from the stamping device 200 at the outlet 250 by hand.

In the present exemplary embodiment of FIG. 6 too, the outlet 250 has a roller drive which serves to feed the insulating bar 10 in the longitudinal direction of the stamping device 200.

The stamping device 200 may be constructed to have a machine length of for example approximately 2500 to 2800 mm. The tendency for a slightly smaller extent in the longitudinal direction by comparison with the stamping device 100 in FIG. 5 results mainly from the fact of using the roller feed 202 and 250, which take up less space.

Figure 7:
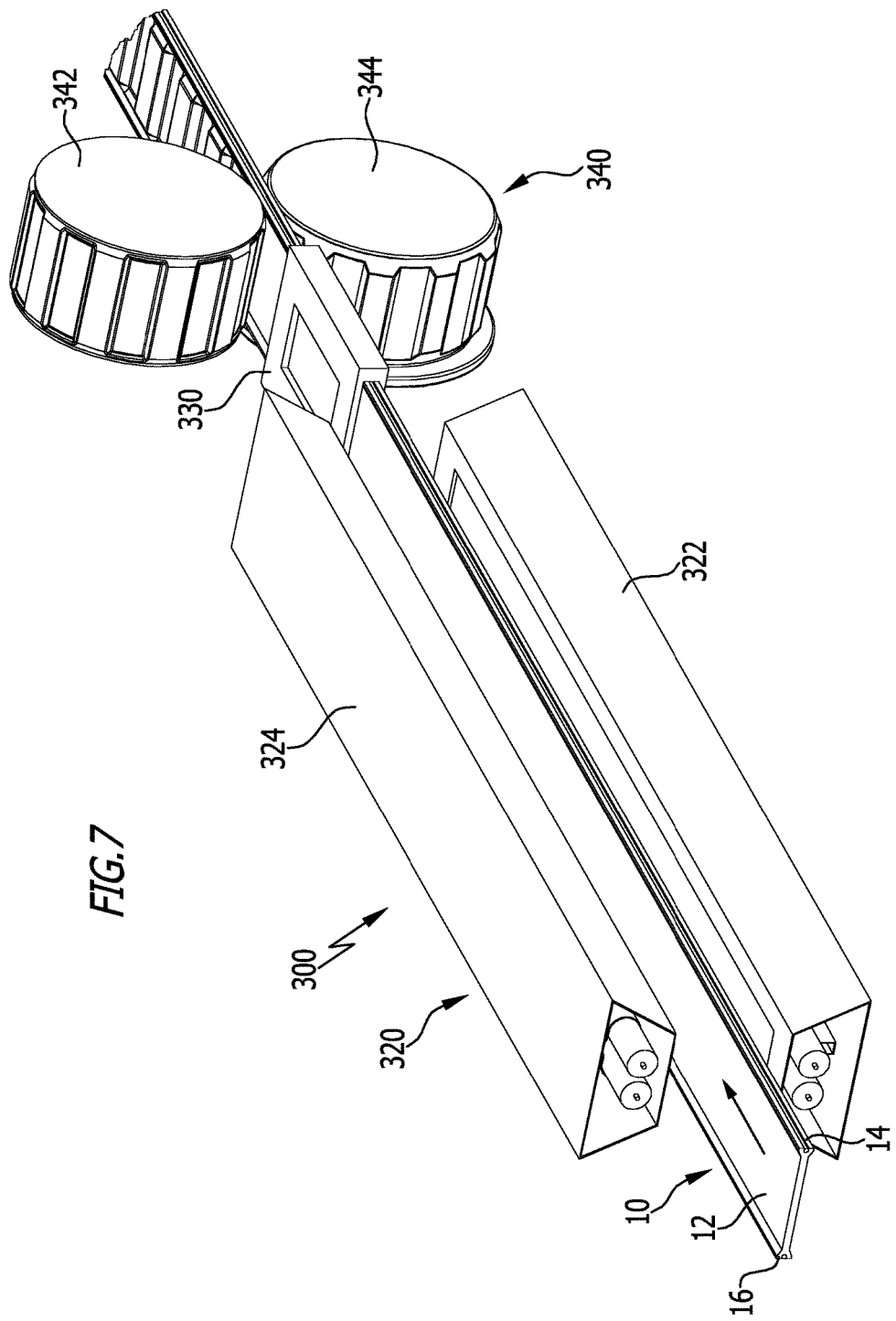
FIG. 7 shows a fourth stamping device for carrying out the method according to the invention.

FIG. 7 shows, in a highly simplified schematic illustration, a third variant of a stamping device 300, which unlike the embodiments described hitherto is intended for performing the method continuously. For the sake of clarity, shielding of the connection strips has been omitted from the drawing.

The blanks 10 that are introduced into the stamping device 300 are first introduced into a heating device 320, which may be constructed to have one or multiple stages. Once again, heating elements 322, 324, which are shown in the form of IR radiant heaters, are provided above and below the transport plane for the blanks 10.

Once the base body 12 of the blank 10 has been heated to the forming temperature, the blank 10, guided by a mount 330, passes through a stamping station 340 that includes two synchronously running stamping wheels 342, 344, which are described in further detail in connection with FIG. 8A. Because of the relatively small contact surface between the stamping tool and the blank 10, forming of the base body 12 can be achieved with considerably smaller forces. In this variant too, a two-stage or multiple-stage forming may be performed, in which case two or more pairs of stamping wheels 342, 344 are used one after the other.

Figure 8A:
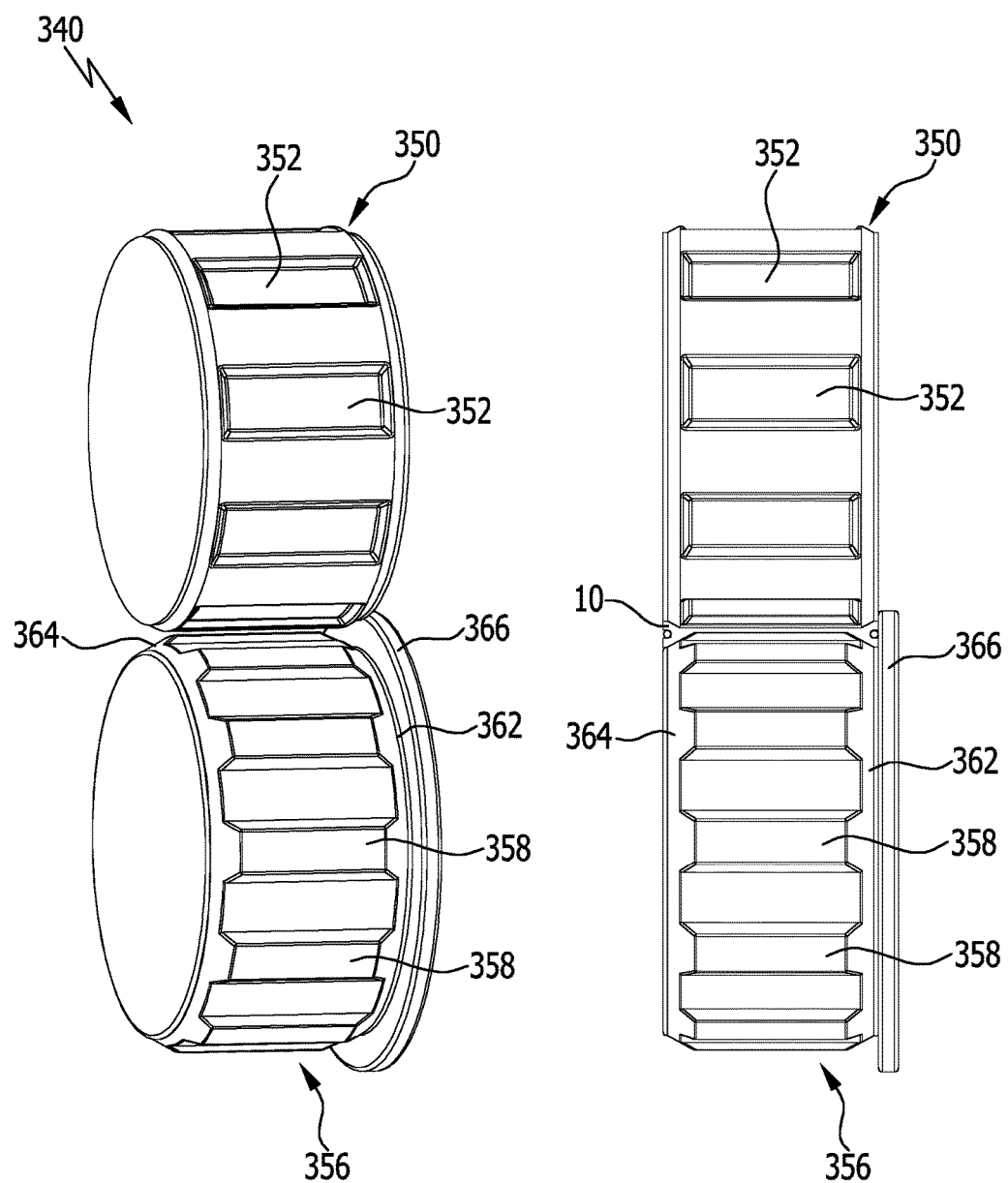
FIG. 8A shows a stamping tool for use in the stamping device in FIG. 7.

In the case of the pairs of stamping wheels 342, 344, a first stamping wheel 342 has raised portions 352 on its peripheral face 350, while the second stamping wheel 344 has on its peripheral face 356 recesses 358 that complement the raised portions 352 and into which plastics material that is displaced by the raised portions 352 of the first stamping wheel 342 during forming can be diverted (cf. FIG. 8A). In the front view, illustrated on the right in FIG. 8A, the insulating bar 10 is also included in the drawing.

Preferably, the stamping wheels 342, 344 have on their edges peripheral recesses 362, 364 and where appropriate projections 366, which serve to guide the connection strips 14, 16 of the insulating bars 10. As a result, the geometry of the connection strips is at the same time protected and supported, such that a very small dimensional tolerance can be ensured in respect of the connection strips 14, 16.

FIG. 8B shows an alternative stamping tool 370, which can be used with a continuous forming of blanks that have been heated to forming temperature.

The stamping tool 370 includes two link chains 372, 374 that are guided to revolve around deflection rollers 380, 382 and 384, 386, wherein the first link chain 372 has raised portions 392 on its outer side 390 and the second link chain has on its outer side 396 recesses 398 that are constructed in a manner complementing the raised portions 392.

Once again, recesses and projections that protect and at the same time support the connection strips 14, 16 of the insulating bars 10 may be provided on the outer faces 390, 396 of the link chains 372, 374.

Where appropriate, the deflection rollers 382, 384 may be heated in order to ensure temperature conditions that are controlled during the forming procedure.

In the front view, illustrated on the right in FIG. 8B, the insulating bar 10 is also included in the drawing.

Finally, FIG. 8C shows a stamping tool 420 in which there are likewise two link chains 422, 424. In this exemplary embodiment, the link chains are each guided to revolve around three deflection rollers 430, 432, 434 and 436, 438, 440 respectively, wherein the first link chain 422 has raised portions 444 on its outer side 442 and the second link chain 424 has on its outer side 446 recesses 448 that are constructed in a manner complementing the raised portions 444.

In this exemplary embodiment, a stamping force is applicable to two of the deflection rollers 432, 434 and 438, 440 respectively, such that the forming can take place in two successive stages. The deflection rollers ensuring the first forming step are preferably heated to a higher temperature than those provided for the second forming step.

Recesses and projections (not shown) may once again be provided on the outer faces of the link chains 422, 424, and these protect and at the same time support the connection strips 14, 16 of the insulating bars 10.

In the foregoing, the stamping devices have been described as individual devices. So that the manufacturing surfaces to which the stamping devices are applied can be utilised as well as possible, it may also be provided for two and more stamping devices to be set up and operated in parallel next to one another.

Moreover, it may be provided according to the invention for the insulating bar blanks 10, after extrusion, not to be cooled to ambient temperature and where appropriate stored but to be supplied substantially directly to the stamping devices for forming. From an energy point of view, it is particularly preferred here to introduce the insulating bar blanks 10 directly into the stamping devices with a certain proportion of residual heat such that the same effect for which a two-stage heating device would otherwise be required is achievable even with a single-stage heating device.

The invention claimed is:

1. A method for manufacturing an insulating bar made from a thermoplastic plastics material, wherein the insulating bar has a strip-like base body and, integrally formed on the opposite longitudinal edges thereof, connection strips having a geometry, and wherein the base body is constructed alternately with raised portions and recesses, as seen in a longitudinal direction of the insulating bar, the method comprising:
shaping the insulating bar as a blank having a substantially planar structure of the base body without raised portions and recesses but with the connection strips;
cooling the insulating bar blank to a temperature corresponding to a maximum long-term service temperature of the thermoplastic plastics material or lower;
heating the base body of the insulating bar blank to a forming temperature which temperature, if the thermoplastic plastics material is a crystalline plastics material having a crystalline melting point, is approximately 30° C. below the crystallite melting point or higher, and if the thermoplastic plastics material is an amorphous plastics material having a softening point, is approximately 30° C. above the softening point or higher;
forming the base body by a tool to produce the alternating raised portions and recesses, wherein the geometry of the connection strips is retained; and
cooling the insulating bar to a temperature corresponding to the maximum long-term service temperature or lower.

2. The method according to claim 1, including forming alternating raised portions and recesses at regular intervals, as seen in the longitudinal direction of the insulating bar.

3. The method according to claim 1, including producing the raised portions and recesses such that they extend substantially over the entire width of the base body.

4. The method according to claim 3, wherein the raised portions and recesses extend substantially perpendicular to the longitudinal direction of the insulating bar.

5. The method according to claim 1, including first cooling the insulating bar blank to a temperature of approximately 50° C. or less.

6. The method according to claim 1, including protecting the connection strips from the introduction of heat during heating of the base body to the forming temperature.

7. The method of claim 6, including keeping the connection strips at a temperature that corresponds to the maximum long-term service temperature or lower during heating of the base body to the forming temperature.

8. The method according to claim 1, including protecting the connection strips from the introduction of heat during heating of the base body to the forming temperature, and during forming of the base body.

9. The method of claim 8, including keeping the connection strips at a temperature that corresponds to the maximum long-term service temperature or lower during heating of the base body to the forming temperature, and during forming of the base body.

10. The method according to claim 1, wherein, if the thermoplastic plastics material is a crystalline plastics material, the forming temperature is limited to a value approximately 30° C. above the crystallite melting point, and, if the thermoplastic plastics material is amorphous plastics material, the forming temperature is limited to a value approximately 60° C. above the softening point.

11. The method according to claim 1, including heating the base body to the forming temperature by radiation, convection, ultrasound or contact heating.

12. The method according to claim 11, including introducing energy during heating of the base body on two opposite sides of the base body.

13. The method according to claim 1, wherein the tool is kept at a temperature that is lower than approximately 120° C.

14. The method according to claim 13, wherein the tool is kept at a temperature in the range of approximately 50° C. to approximately 120° C.

15. The method according to claim 1, including cooling the insulating bar to a temperature of approximately 50° C. or less after forming.

16. The method according to claim 1, wherein the thermoplastic plastics material used is selected from polyamides (PA), polypropylene (PP), acrylonitrile butadiene styrene copolymers (ABS), polyphenylene ether (PPE), syndiotactic polystyrene (sPS), polyvinyl chloride (PVC), polyesters, polyketones, thermo-plastic polyurethanes (TPU) and blends of the above-mentioned polymers.

17. The method according to claim 1, wherein the plastics material is a compact, substantially pore-free material.

18. The method according to claim 1, wherein the plastics material is present as a porous material in at least a region of the insulating bar.

19. The method of claim 18, wherein in the base body of the insulating bar is a porous material.

20. The method according to claim 18, wherein the porous plastics material of the insulating bar has a pore volume in the range of approximately 5 to 30 vol %.

21. The method according to claim 18, wherein the porous plastics material of the insulating bar has an average pore size of approximately 5 µm to approximately 150 µm.

22. The method according to claim 1, wherein the thermoplastic plastics material includes one or more additives selected from glass fibres, mineral fibres, plastics fibres, hollow glass spheres, fire retardants and expansion and blowing agents.

23. The method according to claim 1, wherein the thermoplastic plastics material includes an impact modifier.

24. The method according to claim 1, wherein forming the base body includes thermoforming or compressed air forming.

25. The method according to claim 24, wherein forming includes using a stamping tool.

26. The method of claim 25, wherein the stamping tool is selected from a stamping die, a stamping wheel or a multiple-part stamping tool and a multi-part chain-shaped stamping tool.

27. The method according to claim 1, including drying the insulating bar blank before forming is carried out.

28. The method according to claim 1, including forming the insulating bar blank continuously.

29. The method according to claim 1, wherein forming the insulating bar blank includes a plurality of steps.

30. The method of claim 1, comprising shaping the insulating bar blank in an extrusion procedure and supplying the insulting bar blank to a stamping device serving as the tool to produce the alternating raised portions and recesses of the insulating bar while the insulating bar blank retains a predetermined proportion of residual heat from the extrusion procedure, and supplying retained residual heat directly to the stamping device.

* * * * *